Patented Nov. 30, 1948

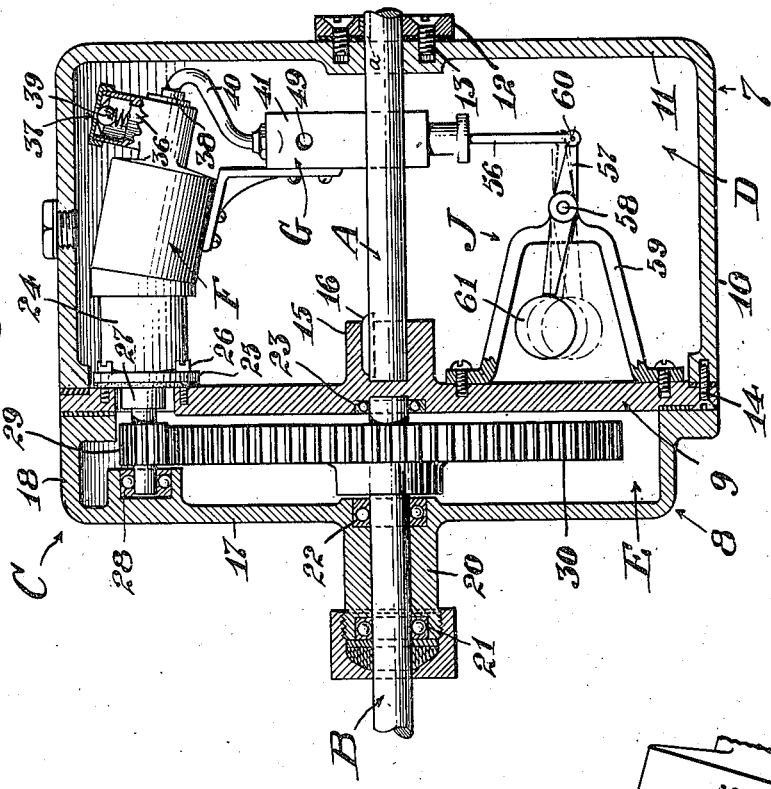

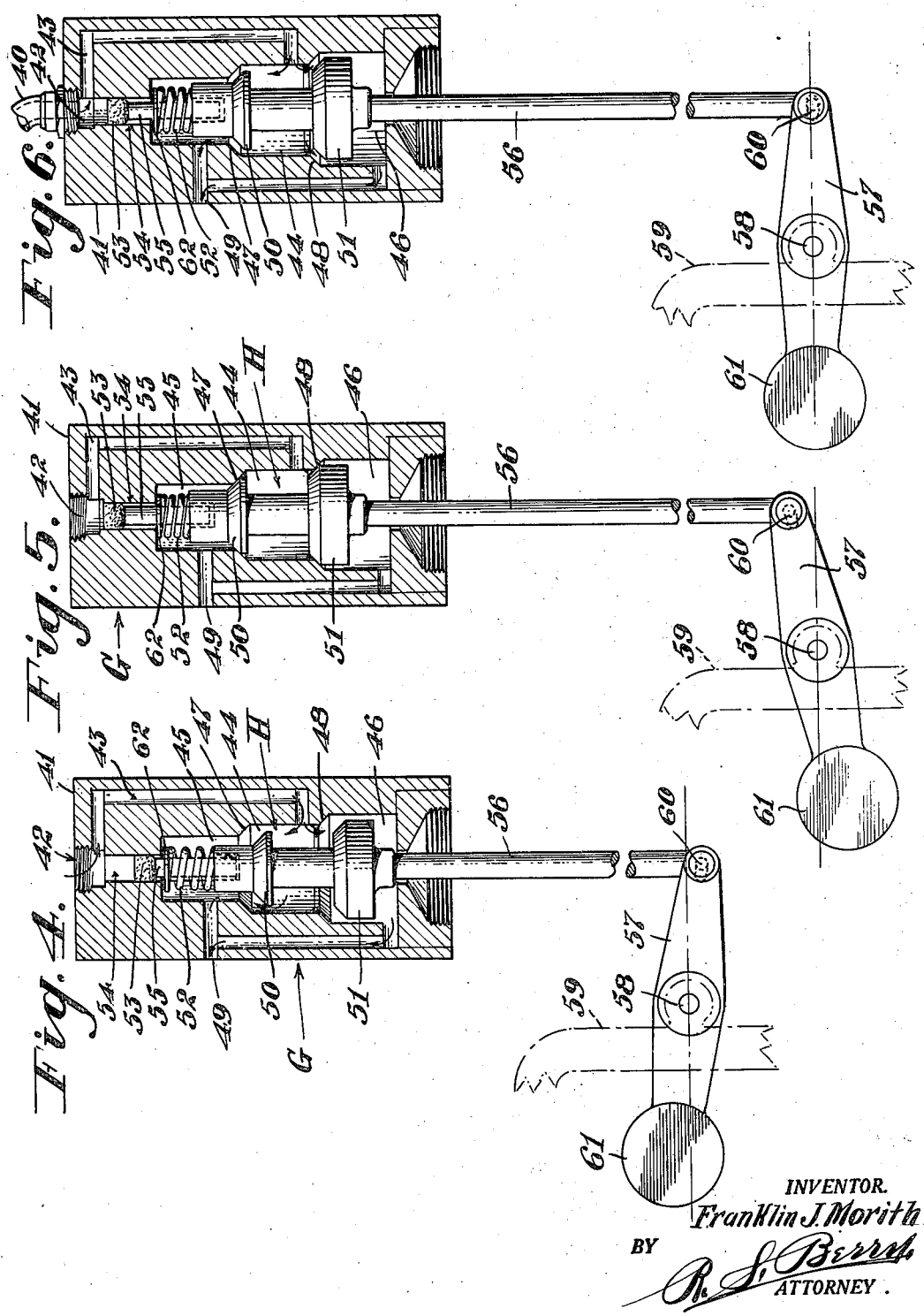

2,455,082

UNITED STATES PATENT OFFICE 2,455,082

VARIABLE SPEED AND POWER TRANSMISSION

Franklin J. Morith, Huntington Park, Calif.

Application April 9, 1945, Serial No. 587,321

7 Claims. (Cl. 74—294)

This invention relates to power transmission and particularly pertains to a variable speed and power transmission of the type in which the ratio between a drive and a driven shaft to which the transmission is applied may be automatically varied directly by the load on the driven shaft.

An object of the invention is to provide a mechanism for transmitting power from a drive shaft to a driven shaft with varying ratios according to loads imposed on the driven shaft which will afford an infinite number of ratios between the drive shaft and the driven shaft.

Another object is to provide a transmission mechanism of the above character in which the transmission of variable speed and power from a drive to a driven shaft is effected through the medium of a rotary pump, the turning movement of which is either inhibited or varied from static to unrestrained or free rotation by automatically controlling the discharge of liquid from the pump through the medium of a governor controlled relief valve operating in response to variation in speed of the drive shaft and load, which mechanism embodies an arrangement of parts which may be readily assembled, and which is highly efficient in operation.

With the foregoing objects in view, together with such other objects and advantages as may subsequently appear, the invention resides in the parts and in the combination, construction, and arrangement of parts hereinafter described and claimed, and illustrated by way of example in the accompanying drawing, in which Fig. 1 is a view in end elevation of the transmission housing;

Fig. 2 is a view in vertical section, with parts in elevation taken on the line 2—2 of Fig. 1 showing the transmission assembly;

Fig. 3 is a detail in elevation and section of a pump element employed in the assembly;

Figs. 4, 5 and 6 are diagrams depicting the operation of the governor controlled relief valve.

Referring to the drawings more specifically, A indicates a drive shaft and B denotes a driven shaft extending in axial alignment with the drive shaft with one end thereof disposed contiguous the outer end of the latter.

Encompassing the contiguous ends of the shafts A and B is a transmission housing C which comprises end sections 7 and 8 and an intermediate section 9. The end section 7 embodies a cylindrical side wall 10 and an end wall 11 which latter is fixedly secured to a collar 12 attached to the drive shaft A as by a key $a$; the wall 11 being connected to the collar by screws 13. The intermediate section 9 constitutes a wall extending parallel to the end wall 11 which wall section is detachably secured to the outer end of the cylindrical wall 10 of section 7 as by screws 14. The wall section 9 is formed with a hub 15 into which the outer end of the drive shaft A extends; the drive shaft and hub being interconnected as by a key 16. The end section 8 embodies an end wall 17 and a flanged annular side wall 18 which is detachably secured to the intermediate wall section 9 as by bolts 19.

A hub 20 is formed on the end wall 17 into which the shaft B extends; the hub being fitted with bearings 21 and 22 affording a rotary mounting for the shaft B and the outer portion of the housing C relating to each other. The shaft B extends across the interior of the end section 8 and is supported in bearings 23 in the wall section 9. The wall section 9 separates the housing into a compartment D within the section 7 and a compartment E within the section 8.

Mounted on the wall section 9 and extending into the compartment D is a pump F embodying a housing 24 formed with an end flange 25 secured to the wall section 9 by screws 26. The pump includes a rotary shaft 27 which extends through the wall 9 and across the compartment E and has its outer end supported in bearings 28 carried by the end wall 8 of the housing section C. A pinion 29 on the shaft 27 meshes with a gear wheel 30 arranged in the compartment E and fixed on the driven shaft B. The pump F comprises essentially a positive action pump of the rotary type and may be of any suitable construction. It is here shown as consisting of a conventional pump now on the market embodying a series of pistons 31 connected to the pump shaft 27 in annular relation thereto by connecting rods 32 having ball and socket connections 33 carried on the inner end of the pump shaft. The pistons 31 are reciprocable in associated pump cylinders 35 opening to a chamber 36 in the outer end portion of the pump housing fitted with an intake 37 and an outlet 38. The pump inlet 37 is normally closed by a spring-pressed inwardly opening ball valve 39. The outlet 38 connects with a conduit 40 which leads to the upper end of the housing 41 of a relief valve G arranged in the compartment D and here shown as carried by a bracket attached to the pump housing 24.

The relief valve G is constructed in the fashion illustrated schematically in Figs. 4, 5 and 6 and embodies an intake passage 42 with which the pump outlet conduit 40 connects.

Leading from the valve intake passage 42 is a passage 43 leading and opening to a valve bore H in the valve housing which housing embodies an intermediate chamber 44 with which the passage 43 communicates and end chambers 45 and 46. The valve bore H is provided with a valve seat 47 at the juncture of the chambers 44 and 45 and with a valve seat 48 at the juncture of the chambers 44 and 46. The chamber 45 is reduced relative to the chamber 44 while the chamber 46 is enlarged relative to the chamber 44. The end chambers 45 and 46 open to the compartment D in the housing C through a passage 49.

A pair of connected valve elements 50 and 51 are mounted in the valve bore H and are arranged to cooperate with the valve seats 47 and 48 to coincidentally open or close communication between the intermediate chamber 44 and the end chambers 45 and 46. The valve elements are normally held in an open position under the urge of a spring 52 interposed between the valve element 50 and the end wall of the chamber 45 and which spring 52 manifestly opposes movement of the valve elements to their closed position. By providing the pair of valve elements the valve unit is balanced.

A piston 53 is mounted in a cylindrical passage 54 extending axially of the valve chamber H and leading from the chamber 45 to the valve intake passage 42. The piston 53 is provided with a stem 55 which is arranged to abut the outer end of the valve assembly whereby the piston will act upon being subjected to pump pressure, to effect opening of the valve elements or to retard closing thereof independent of the spring 52.

The valve elements 50 and 51 are carried on a stem 56 projecting from the valve housing 41 and connected to its outer end with a centrifugal governor J arranged in the compartment D and carried by the wall section 9. This governor is here shown as comprising a rocker arm 57 pivoted at 58 to a bracket 59 carried by the wall section 9, one end of which rocker arm is pivoted at 60 to the valve stem 56 and is fitted at its opposite end with a fly weight 61. The rocker arm 57 is mounted to swing on a plane extending diametrically through the shaft A so that the fly weight 61 will respond to the action of centrifugal force, developed by rotation of the housing C.

The spring 52 is of sufficient tension to more than counterbalance the fly weight 61 so that when the parts are stationary or slowly revolving the valve elements will be maintained in their open position as shown in Fig. 4 in which position the flow of liquid from the pump through the relief valve G will be unrestricted. It will be understood that the chamber D in the transmission housing will be filled with a suitable liquid such as an oil of the character employed in hydraulic equipment and which liquid is subject to being drawn into the pump through the intake 37 on rotation of the pump shaft 27 and be delivered through the relief valve G back into the chamber D.

It will be seen from the foregoing that when the valve elements 50 and 51 are in their open position shown in Fig. 4, allowing for unrestricted flow of liquid through the relief valve G, the pump F may freely operate.

When the parts are thus positioned the drive shaft A may be rotated without effecting rotation of the driven shaft B since the rotation of the transmission housing C with the drive shaft A will cause the pinions 29 to freely traverse the gear 30, which ordinarily is held stationary by the load imposed on the shaft B, thus rotating the pinion 29 and effecting operation of the pump. In like fashion rotation of the shaft B relative to the shaft A will turn the pinion 29 and effect operation of the pump.

On accelerating rotation of the drive shaft A and housing C such that the fly weight 61 of the governor J will overcome the spring 52 the valves 50 and 51 will move toward their closed position as shown in Fig. 6. This will cause pressure from the pump to build up in the valve intake passage 42 and thereby impose pressure on the piston 53 such as to move the latter outwardly and cause the stem thereof to abut the valve assembly and thereby oppose closing of the valve, thus placing the valve in a floating relation between the action of the fly weight 61 and the piston 53. Resistance will now be offered to the operation of the pump which resistance will be transmitted to the pinion 29 so as to oppose rotation of the latter and thereby effect a driving action of the pinion on the gear 30 and the driven shaft B, thus effecting transmission from the drive shaft A to the driven shaft B at a ratio dependent upon the load on shaft B and the R. P. M. of the drive shaft. It will be seen that the valve G controls operation of the pump which in turn controls turning movement of the pinion 29 so as to govern the ratio between the drive and the driven shaft. The heavier the load on the driven shaft B the lower the ratio and the lighter the load the higher the ratio.

At a predetermined load and R. P. M. of the drive shaft determined by the relative action of the spring 52 and the fly weight 61 the valve elements will move to their closed position shown in Fig. 5 under the urge of the governor. When the valve parts are in this position operation of the pump will be blocked since the circulation of the pump liquid will be stopped. The pinion 29 will then be held against rotation so as to cause the gear 30 to rotate with the housing C thus effecting connection from the drive shaft A to the driven shaft B at a one to one ratio.

The moment at which the valve opens under the urge of the spring 52 may be regulated by adjusting the tension of the spring which may be effected by placing one or more washers or shims 62 between an end of the spring and its abutment to increase its tension, or to remove such shims to decrease the spring tension.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a transmission mechanism embodying a drive shaft, a driven shaft, and a liquid containing housing encompassing meeting ends of said shafts affixed to the drive shaft and turnable relative to the driven shaft, a gear wheel fixed on said driven shaft, a positive action rotary pump carried by said housing having an inlet and an outlet, said inlet adapted to admit liquid from the housing to the pump, a relief valve, a conduit leading from said pump outlet to said valve, said valve having an outlet leading to the interior of said housing, spring means effective normally to maintain said valve open to permit free fluid flow between said pump and said valve outlet, a centrifugal governor carried by said housing, and connections between said governor and said valve; said governor and connections being constructed and arranged to close said valve partly or wholly under the action of centrifugal force with resultant restriction or prevention of the discharge of liquid from said pump.

2. The structure called for in claim 1 together with means responsive to pump pressure for restraining closing of said valve counter to said governor.

3. The structure called for in claim 1 together with a piston embodied in said valve arranged to tend to open said valve and to hold it open independent of the valve opening spring.

4. In a transmission mechanism, a liquid containing housing, a drive shaft to which said housing is affixed, a rotary positive action pump carried by said housing adapted to circulate the liquid within the housing, a driven shaft, a gear wheel fixed on said shaft, a pinion geared to said wheel attached to said pump, and valve means for inhibiting or restricting flow of the liquid from said pump and operable to permit free flow of liquid through the pump to control turning movement of said pinion or prevent turning movement thereof, said valve means including an element responsive to fluid pressure generated by said pump and an element responsive to centrifugal force connected together for operation in opposition to each other.

5. In a transmission mechanism, the combination with a drive shaft and a driven shaft of a liquid containing housing fixed on said drive shaft, a rotary shaft carried by said housing, gear connections between said rotary shaft and said driven shaft, a pumping element carried by said housing connected to said rotary shaft operable thereby to pump liquid in said housing, a valve adapted to prevent retard or permit free discharge of liquid from said pump, a governor carried by said housing controlling the operation of said valve and means incorporated in and forming a part of said valve constructed and arranged to respond to fluid pressure generated by said pump and by such response to oppose the action of said governor.

6. In a transmission mechanism embodying a drive shaft, a driven shaft, a liquid containing housing fixed on said drive shaft, and a rotary pump having an intake and an outlet and carried by said housing and geared to said driven shaft, said pump being adapted to pump the liquid in said housing; of a valve structure associated with said pump having an inlet connected to the pump outlet, and having an outlet opening to the interior of said housing, a balanced valve element in said structure, spring means normally retaining said valve element in an open position and opposing closing of said element, a governor carried by said housing, connections between said governor and said valve element; said governor being arranged to close or partly close said valve element in opposition to said spring under the urge of centrifugal force and means responsive to pump pressure constructed and arranged to oppose the closing of said valve element independently of said spring.

7. The structure called for in claim 6 in which the pump pressure responsive means comprises a cylinder opening to the valve inlet, and a piston in said cylinder abutting said valve element.

FRANKLIN J. MORITH.

REFERENCES CITED

The following references are of record in the file of this patent:

UNITED STATES PATENTS

| Number | Name | Date |
| --- | --- | --- |
| 1,953,551 | Bullock | Apr. 3, 1934 |
| 2,019,849 | Foster | Nov. 5, 1935 |
| 2,197,165 | Webster | Apr. 16, 1940 |

FOREIGN PATENTS

| Number | Country | Date |
| --- | --- | --- |
| 664,895 | France | Sept. 11, 1929 |